US011164341B2

(12) United States Patent
Bissex et al.

(10) Patent No.: US 11,164,341 B2
(45) Date of Patent: Nov. 2, 2021

(54) IDENTIFYING OBJECTS OF INTEREST IN AUGMENTED REALITY (71) Applicant: INTERNATIONAL BUSINESS MACHINES CORPORATION, Armonk, NY (US)

(72) Inventors: H. Ramsey Bissex, Irving, TX (US); Ernest Bernard Williams, Jr., Dallas, TX (US); Zachary James Goodman, Euless, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/555,284

(22) Filed: Aug. 29, 2019

(65) Prior Publication Data
US 2021/0065405 A1 Mar. 4, 2021

(51) Int. Cl.
G06T 11/00 (2006.01)
G06K 9/00 (2006.01)
G10L 25/51 (2013.01)
G06K 9/62 (2006.01)

(52) U.S. Cl.
CPC .......... G06T 11/00 (2013.01); G06K 9/00315 (2013.01); G06K 9/00335 (2013.01); G06K 9/6262 (2013.01); G10L 25/51 (2013.01)

(58) Field of Classification Search
CPC ................ G06T 11/00; G06K 9/00315; G06K 9/00335; G06K 9/6262; G10L 25/51
See application file for complete search history.

(56) References Cited

U.S. PATENT DOCUMENTS

| 8,989,401 | B2 | 3/2015 | Ojanpera |
| 9,589,372 | B1 | 3/2017 | Bean |
| 9,983,687 | B1* | 5/2018 | Forsblom ................ G06F 3/017 |
| 2008/0132210 | A1 | 6/2008 | Korneluk |
| 2012/0077172 | A1 | 3/2012 | Watanabe |
| 2012/0215519 | A1* | 8/2012 | Park ................... G10L 21/0208 704/2 |
| 2014/0081634 | A1 | 3/2014 | Forutanpour |
| 2015/0042799 | A1 | 2/2015 | Zhang |

(Continued)

FOREIGN PATENT DOCUMENTS

| CN | 101944359 B | 4/2012 |
| EP | 2665255 A1 | 11/2013 |

OTHER PUBLICATIONS

Gellersen et al., "Multi-Sensor Context-Awareness in Mobile Devices and Smart Artefacts", ResearchGate, https://www.researchgate.net/publication/220134157, Oct. 2002, pp. 1-18.

(Continued)

Primary Examiner — Jitesh Patel
(74) Attorney, Agent, or Firm — James W. Kappos (57) ABSTRACT The exemplary embodiments disclose a method, a computer program product, and a computer system for identifying one or more objects of interest in augmented reality. The exemplary embodiments may include detecting one or more cues selected from a group comprising one or more audio cues and one or more visual cues, identifying one or more objects of interest based on the detected one or more cues and a model, and emphasizing the one or more objects of interest within an augmented reality.

20 Claims, 5 Drawing Sheets (56) References Cited

U.S. PATENT DOCUMENTS

| | | |
|---|---|---|
| 2015/0070386 A1* | 3/2015 | Ferens .................. G02B 27/01 |
| | | 345/633 |
| 2016/0203359 A1* | 7/2016 | von und zu Liechtenstein ........... |
| | | G06F 3/013 |
| | | 345/156 |
| 2016/0210784 A1* | 7/2016 | Ramsby ............. G02B 27/0176 |
| 2017/0205891 A1* | 7/2017 | Mason .................... G06F 3/005 |
| 2017/0277257 A1 | 9/2017 | Ota |
| 2017/0354796 A1 | 12/2017 | Gussen |
| 2018/0047396 A1* | 2/2018 | Forutanpour ........... G10L 15/26 |
| 2018/0189354 A1* | 7/2018 | Paine ....................... G06F 3/167 |
| 2019/0043267 A1* | 2/2019 | Anderson ............... G06F 1/163 |
| 2019/0079579 A1 | 3/2019 | Bastide |

OTHER PUBLICATIONS

Mell et al., "The NIST Definition of Cloud Computing", National Institute of Standards and Technology, Special Publication 800-145, Sep. 2011, pp. 1-7.

Mizokami, "U. S. Troops to Test Augmented Reality By 2019", https://www.popularmechanics.com/military/a19635016/us-troops-to-tes . . . , Mar. 29, 2018, pp. 1-5.

Morozov, "Augmented Reality in Military: AR Can Enhance Warfare and Training", https://jasoren.com/augmented-reality-military/, printed Jun. 24, 2019, pp. 1-4.

* cited by examiner

IDENTIFYING OBJECTS OF INTEREST IN AUGMENTED REALITY

BACKGROUND

The exemplary embodiments relate generally to computing, and more particularly to identifying an object of interest within augmented reality.

Augmented reality is an interactive experience of a real-world environment where the objects that reside in the real-world are enhanced by computer-generated perceptual information. In this way, augmented reality alters one's ongoing perception of a real-world environment, blending components of the digital world with a person's perception of the real world through the integration of immersive sensations, which are perceived as natural parts of an environment. With the help of computer vision and object recognition, augmented reality can enrich a user's experience in real time.

SUMMARY

The exemplary embodiments disclose a method, a computer program product, and a computer system for identifying one or more objects of interest in augmented reality. The exemplary embodiments may include detecting one or more cues selected from a group comprising one or more audio cues and one or more visual cues, identifying one or more objects of interest based on the detected one or more cues and a model, and emphasizing the one or more objects of interest within an augmented reality.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

As previously described, augmented reality is an interactive experience of a real-world environment where the objects that reside in the real-world are enhanced by computer-generated perceptual information. In this way, augmented reality alters one's ongoing perception of a real-world environment, blending components of the digital world with a person's perception of the real world through the integration of immersive sensations, which are perceived as natural parts of an environment. With the help of computer vision and object recognition, augmented reality can enrich a user's experience in real time.

In some environments it can be very difficult to identify an object of interest. Additionally, if many people or objects are in that environment, it can be difficult to locate, identify, and discern the object of interest. For example, a user could be giving a presentation to a large crowd and a member of the audience could ask a question or make a statement but, due to the size of the audience, the presenter may not be able to identify the person who asked the question. Alternatively, a user may be in a crowded or dark environment that makes it difficult to identify a person of interest. Augmented reality can be used to emphasize the object or person of interest to make it easy for the user to locate. Accordingly, example embodiments are directed to a method, computer program product, and computer system that will help facilitate identifying objects of interest in distracting environments.

In embodiments, cognitive-based computer vision may be used to enhance the object of interest (OOIs), including people of interest and areas of interest, and bridge the gap of tracking audio, voice, and sound contextual relationships within dynamic real time environments. In particular, example embodiments may be configured for identifying audio (e.g., speech), visual (e.g., facial expressions and gestures), and other cues for identifying an object of interest.

Use cases of embodiments described herein may relate to improvement of, for example, but not limited to, OOI identification within a presentation setting (e.g., a speaker identifying an audience member, speaker counting votes, auctioneers identifying bidders, etc.), identifying one or more OOIs within a bright, dark, crowded, noisy, etc. setting (e.g., within crowds, movie theatres, at night, next to a large body of water with glare, on a busy street corner, etc.), transcribing, translating, and/or amplifying audio for presentation to a user within noisy or multilingual environments, identifying those in need of medical assistance (e.g., search and rescue) during an emergency, and identifying noise, motion, etc. within data processing systems such as autonomous vehicles and video surveillance. Other use cases may involve situations such as identifying a party member in a dark/noisy movie theater, music festival, athletic arena/stadium, etc. In general, it will be appreciated that embodiments described herein may relate to aiding a user in the identification of any object of interest, such as an interlocutor, noise, motion, etc., within an environment.

Figure 1:
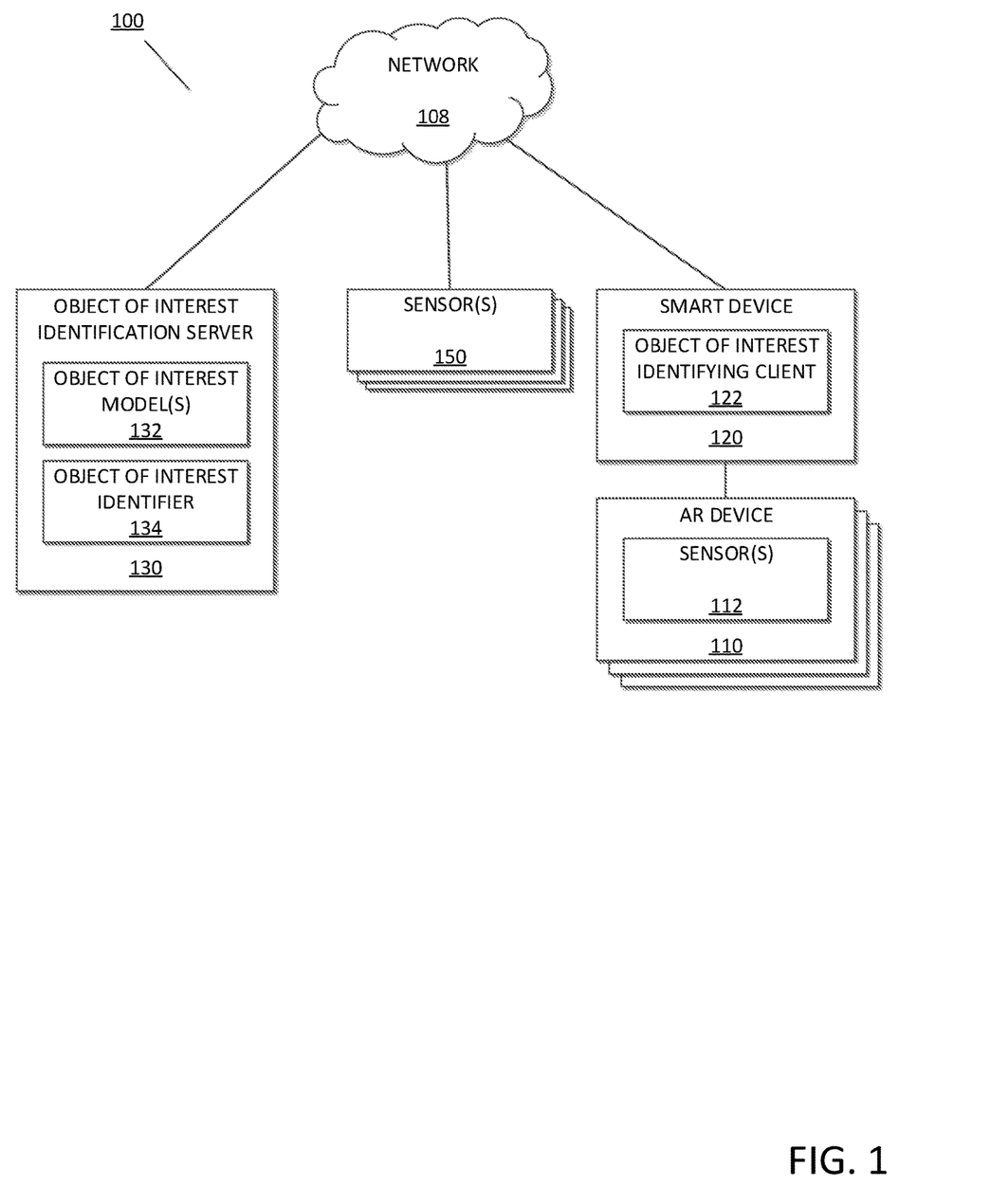
FIG. 1 depicts an exemplary schematic diagram of an object of interest (OOI) identification system, in accordance with the exemplary embodiments.

FIG. 1 depicts the OOI identification system 100, in accordance with the exemplary embodiments. According to the exemplary embodiments, the OOI identification system 100 may include one or more augmented reality (AR) devices 110, a smart device 120, one or more sensors 150, and an OOI identification server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the OOI identification system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the AR device 110 may be a wearable device capable of overlaying/superimposing computer-generated images upon a user view of a real world scene. In embodiments, the AR device 110 may include one or more sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the AR device 110 is shown as a single device, in other embodiments, the AR device 110 may be comprised of a cluster or plurality of computing devices, in a modular manner, etc., working together or working independently. The AR device 110 is described in greater detail as a hardware implementation with reference to FIG. 3, as part of a cloud implementation with reference to FIG. 4, and/or as utilizing functional abstraction layers for processing with reference to FIG. 5.

In example embodiments, the sensor(s) 112 may be a camera, microphone, light sensor, infrared sensor, movement detection sensor, pressure detection sensor, thermometer, accelerometer, gyroscope, heart rate monitor, or other sensory hardware equipment. Moreover, the AR device 110 may incorporate an array of the one or more sensors 112 such that information can be obtained by the sensors 112 in multiple directions, at different times/intervals, in different mediums/frequencies, and the like. For example, the AR device 110 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 112, such as trilateration and triangulation. The sensor(s) 112 are described in greater detail with respect to FIGS. 2-5.

In the example embodiment, the smart device 120 includes an OOI identifying client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The OOI identifying client 122 may act as a client in a client-server relationship. The OOI identifying client 122 may also be a software and/or hardware application capable of communicating with and providing a user interface for a user to interact with a server via the network 108. Moreover, in the example embodiment, the OOI identifying client 122 may be capable of transferring data from the AR device 110 and/or the sensor(s) 112 between the smart device 120 and other devices via the network 108. In embodiments, the OOI identifying client 122 utilizes various wired and wireless connection protocols for data transmission and exchange, including Bluetooth, 2.4 gHz and 5 gHz internet, near-field communication, Z-Wave, Zigbee, etc. The OOI identifying client 122 is described in greater detail with respect to FIG. 2.

In the exemplary embodiments, the sensor(s) 150 may be a camera, microphone, light sensor, infrared sensor, movement detection sensor, pressure detection sensor, thermometer, accelerometer, gyroscope, heart rate monitor, or other sensory hardware equipment. In embodiments, the sensor(s) 150 may be incorporated within an environment in which the OOI identification system 100 is implemented. For example, the sensor(s) 150 may be one or more microphones built into an auditorium, a camera built into a facility, etc. Moreover, data processing techniques may be implemented such that directional information of visual and audio data can be obtained based on signals received by each of the sensors 150, such as trilateration and triangulation. For example, in embodiments, the sensor 150 may be incorporated into an auditorium and may communicate via the network 108. In other embodiments, the sensor 150 may be integrated with other smart devices, e.g., smart phones and laptops, within an environment implementing the OOI identification system 100. Therefore, in embodiments, the sensor 150 may communicate directly with other networks and devices, such as the network 108. The sensor(s) 150 are described in greater detail with respect to FIGS. 2-5.

In the exemplary embodiments, the OOI identification server 130 may include one or more OOI identifiers 134 or OOI models 132 and may act as a server in a client-server relationship with the OOI identifying client 122. The OOI identification server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the OOI identification server 130 is shown as a single device, in other embodiments, the OOI identification server 130 may be comprised of a cluster or plurality of computing devices, working together or working independently. The OOI identification server 130 is described in greater detail as a hardware implementation with reference to FIG. 3, as part of a cloud implementation with reference to FIG. 4, and/or as utilizing functional abstraction layers for processing with reference to FIG. 5.

The OOI model(s) 132 may be one or more algorithms modelling a correlation between one or more cues detected by the sensor(s) 112 and sensor(s) 150 and a person or object of interest. In the example embodiment, the OOI model(s) 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of one or more cues/features being indicative of an object of interest. In embodiments, such features may be, for example, audio or visual cues provided by objects viewed through an augmented reality or other device. The OOI model(s) 132 may weight the features, or cues, based on an effect that the cue has on a probability that an object is the correct object of interest such that cues determined to be more associated with an object of interest are weighted more than those that are not. The OOI model(s) 132 are described in greater detail with reference to FIG. 2.

In the exemplary embodiments, the OOI identifier 134 may be a software and/or hardware program capable of initiating a session and detecting and processing audio cues. In addition, the OOI identifier 134 may be further configured for detecting and processing visual cues, including facial cues and gesture cues. Moreover, the OOI identifier 134 may be further configured for aggregating the processed cues and emphasizing an OOI based on the aggregated cues. The OOI identifier 134 is further capable of evaluating whether objects of interest were correctly identified and adjusting models. The OOI identifier 134 is described in greater detail with reference to FIG. 2.

Figure 2:
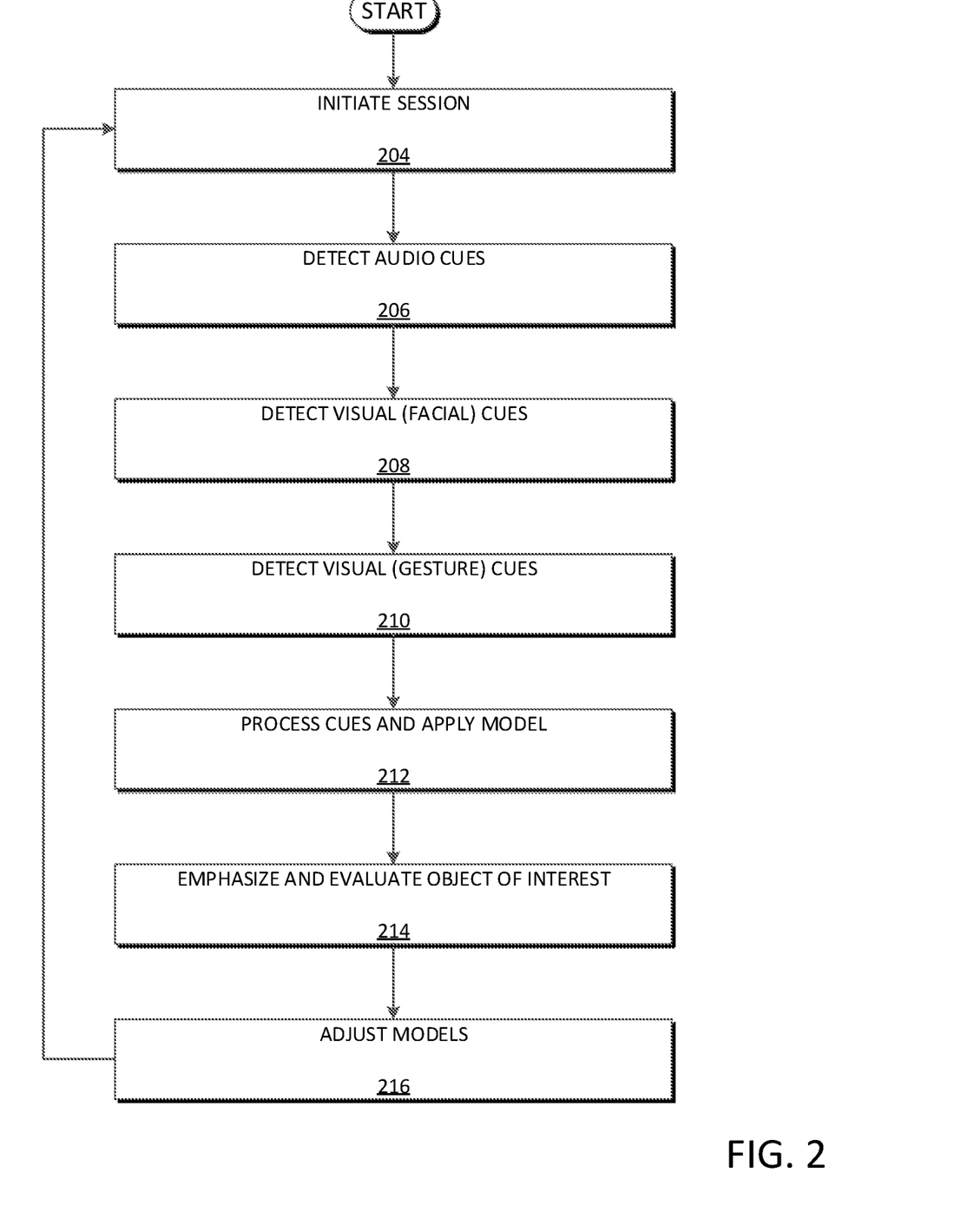
FIG. 2 depicts an exemplary flowchart illustrating the operations of an object of interest (OOI) identifier of the OOI identification system in identifying an OOI within augmented reality, in accordance with the exemplary embodiments.

FIG. 2 depicts an exemplary flowchart illustrating the operations of an OOI identifier 134 of the OOI identification system 100 in identifying an object of interest within augmented reality, in accordance with the exemplary embodiments.

The OOI identifier 134 may initiate a session (step 204). The OOI identifier 134 may initialize a session by configuring user registration, user preferences, participant registration, participant preferences, an environment in which the OOI identification system 100 is implemented, the one or more sensors 112, voiceprints and faceprints, etc. Receiving a user registration configuration may involve the OOI identifier 134 receiving a username, location, device type, the sensor 112 types, and other user information. In some embodiments, configuration of the OOI identifier 134 may further include receiving photo, video, or audio data regarding audience members to analyse for characteristics such as voiceprints and faceprints. This data may be manually uploaded by the user, or automatically uploaded via the network 108 and integrated with social media platforms. This data may act as voiceprints and faceprints of each audience member. Automatically uploading this data from the network 108 may entail generating voiceprint and faceprint profiles for users/participants based on corresponding social media accounts, and may detail user and participant demeanors, mannerisms, accents, inflections, etc. In these embodiments, the OOI identifier 134 may utilize the voiceprint, faceprint, demeanor, mannerism, accent, etc. as data in identifying and emphasizing the OOI via comparing audio and video data collected within the environment with the voiceprint and faceprint of an audience member. Such information may be received by the OOI identifier 134 via the OOI identifier client 122 and the network 108.

Receiving a user preferences configuration may include the OOI identifier 134 receiving a preferred manner in which an object of interest is emphasized, e.g., highlighting, pointing, boxing, etc. (step 204 continued). In addition to a manner in which a user is alerted to an object of interest, other user preferences may include a duration of the emphasis, how many OOIs may be identified and emphasized concurrently, a priority system for emphasizing prioritized OOIs differently than others, preferred language in embodiments incorporating translation and/or transcription services, etc. Additionally, user preferences may include one or more preferred sizes and colors of visual object of interest emphasis, as well as the preferred frequency and amplitude of audio OOI emphasis. These various settings including color, size, frequency, and amplitude may be customized to vary depending on the potential object of interest, subject matter, or context of speech, etc. For example, these various settings may allow the user to distinguish between questions and comments, criticism and praise, and other various types of visual and audio feedback from the object of interest based on various techniques, such as natural language processing (NLP). In the event that the AR device 110 utilizes a user interface on its display, user preferences may also encompass any modifiable settings pertaining to the user interface. For example, the OOI identifier 134 may be configured to display the preferred information about a potential OOI on the AR device 110 such as name, team, group, organization, age, gender, IQ, height, weight, etc. Similarly, participant preferences may include how the participant is viewed on the AR device 110, including options such as color, priority, etc. In embodiments, the OOI identifier 134 may implement a priority system in which objects of greater interest are displayed more prominently than those that are of lesser interest. For example, objects of greater interest may be displayed in different colors, frequencies, etc. than those of lesser interest.

Receiving an environment configuration may include the OOI identifier 134 receiving a means for connecting to the sensors 112 amongst the smart devices 120 as well as the sensors 150 within the environment, audio and video characteristic setup (e.g., acoustics, echo, reverb, etc.), and the like (step 204 continued). The environment configuration may further include a mapping of the environment, such as participant/the smart device 120 locations relative to the sensor(s) 112 and the sensor(s) 150 within the environment (e.g., microphone or camera locations) such that locations may be discerned based on a strength and timing of the signals. In other embodiments, audience members may configure access to the one or more sensors 112 which may be in the form of pressure-sensitive buttons on a remote or on any other accessible piece of hardware. The pressure sensor(s) 112 may also be in digital form, such as buttons displayed on the screens of the smart device 120. The sensor 112 configuration may include identifying, connecting, calibrating, and the like. The participation configuration may include participant registrations, device registrations, remote connections, and the like.

To further illustrate the operations of the OOI identifier 134, reference is now made to an illustrative example where a speaker is opening up a question and answer session to an audience within an auditorium. The OOI identifier 134 receives a speaker configuration that includes the setup of a pair of smart glasses having three cameras spaced apart for location data processing, such as trilateration. In addition, the OOI identifier 134 receives an environment configuration that includes the set-up of a speaking podium for the speaker, three microphones spaced throughout the auditorium, and three video cameras spaced throughout the auditorium. Additionally, the OOI identifier receives data from social media networks corresponding to audience members in order to create voiceprints and faceprints for individual audience members. Lastly, the OOI identifier 134 receives a participant configuration in which one or more participants register to assigned seats and connect a smart device to the conference.

The OOI identifier 134 may detect audio cues (step 206). In embodiments, the OOI identifier 134 may detect audio cues to identify an OOI within an environment. The OOI identifier 134 may detect audio cues via the one or more sensors 112 among users and participants, as well as the sensor(s) 150 within an environment in which the OOI identification system 100 is implemented. For example, the OOI identifier 134 may detect an audio cue using a camera and/or microphone mounted to the AR device 110 or a microphone and/or camera mounted within an auditorium. In further embodiments, the OOI identifier 134 may identify participants using microphones built into participant devices and mapped within an environment, for example a camera microphone integrated into a laptop or cell phone used by an audience participant. Moreover, the OOI identifier 134 may communicate with such a device via a network connection, and the audience member may be seated within an assigned seat such that the OOI identifier 134 may be capable of deducing a relative position of the camera or microphone, and ultimately the person of interest, within the environment.

With reference again to the previously introduced example that included one speaker podium and three microphones located within an auditorium, the OOI identifier 134 detects a question from an audience member faintly from the podium microphone and loudly from the right, suspended microphone.

The OOI identifier 134 may detect visual cues, such as facial cues (step 208). In embodiments, the OOI identifier 134 detects facial cues in order to identify an object or person of interest within an audience or group of people based on movement of the mouth, eye, eyebrow, cheek, forehead, nose, etc. The OOI identifier 134 may detect facial cues via the one or more sensors 112 and/or the sensors 150. For example, the OOI identifier 134 may detect a facial cue using a camera mounted to the AR device 110 or a camera mounted within the environment. Alternatively, the OOI identifier 134 may detect facial cues via other sensory equipment, such as light sensors and movement sensors. In embodiments, movement of a mouth, in conjunction with other facial and bodily expressions, may indicate that an individual is speaking, and the OOI identifier 134 may implement methods to read the lips of the individual for transcription, translation, defining, usage, amplification, etc. The OOI identifier 134 may additionally utilize detected facial expressions to identify emotions, mannerisms, etc. For example, certain facial expressions and/or movements may be associated with anger and/or yelling, while others may be associated with happiness, calmness, excitement, nervousness, etc. Such facial expressions may be used in conjunction with NLP in order to determine a tone emitted by the OOI, such as criticism, praise, desperation, etc. The OOI identifier 134 may further identify an OOI based on an eye gaze or concentration level of a potential OOI. The OOI identifier 134 may require eye contact for a threshold duration to avoid false positives of incidental eye contact or may be coupled with other cues in order to distinguish from attentiveness. Eye gaze may be determined by a direction in which eyes are viewing, while concentration level may be obtained from feature data such as pupil dilation, eyebrow inflection, stillness of the body, silence, a leaning forward of the body, and the like. In general, the OOI identifier 134 may utilize any suitable method for identifying visual facial cues such as speaking, eye gaze, concentration level, and the like.

With reference again to the previously introduced example that included one speaker podium and three video cameras located within an auditorium, the OOI identifier 134 detects an audience member's eye contact with the presenter and mouth movements.

The OOI identifier 134 may detect visual cues, such as gesture cues (step 210). In embodiments, the OOI identifier 134 may detect gesture cues in order to identify an object of interest within an environment. The OOI identifier 134 may detect gesture cues via the one or more sensors 112 and the one or more sensors 150, whether they be integrated into the AR device 110 or implemented within an environment. For example, the OOI identifier 134 may detect a gesture cue using a camera mounted to the AR device 110 or located within the environment. In addition, the OOI identifier 134 may detect gesture cues via wearables, such as smart phones, smart watches, smart glasses, smart rings, smart headbands, and other wearables. Such gestures may include bodily motion such as standing, sitting, lying prone, lying supine, transitioning from one position to another, moving a hand, moving a leg, moving a neck, turning a head, etc. In addition, the OOI identifier 134 may communicate with wearables of others to determine other forms of physiology and physical behavior, or biological characteristics, such as breathing rates, heart rates, perspiration rates, etc., that may be associated with specific situations, such as anxiety from speaking to a large group, and utilize such data in determining an OOI. In other embodiments, audience members may indicate that they would like to speak by exercising one or more sensors 112 which may be in the form of pressure-sensitive buttons on remotes or on any other accessible pieces of hardware. In these embodiments, the OOI identifier 134 may communicate with the pressure sensors to detect when audience participants apply pressure to the respective sensor(s) 112.

With reference again to the previously introduced example that included one speaker podium and three video cameras located within an auditorium, the OOI identifier 134 detects an audience member standing up.

The OOI identifier 134 may process the detected audio and video cues and apply a model (step 212). Such analysis may first include analysis of the individual cues. For example, the OOI identifier 134 may analyse audio cues such as speech and noise to determine a speech and a location of a potential OOI using a mapping of the microphones in an environment, timestamps of the signals, and methods such as triangulation or trilateration. With reference to facial cues, the OOI identifier 134 may process movement of a mouth, a nose, eyes, ears, cheeks, and a forehead to determine that a person is speaking. As it relates to gestural cues, the OOI identifier 134 may process standing, sitting, lying prone, lying supine, transitioning from one position to another, moving a hand, moving a leg, pressing a button, moving a neck, etc., as an indication that a person is an OOI. In the example embodiment, each of the aforementioned cues may be analysed and processed to determine a likely person or object of interest from which the cues emanate. In embodiments, each of these cues may be included as features in a generated model, wherein the model assigns a weight to each of the features indicative of a likelihood that the cue corresponds to a person or object of interest. For example, if hand movement cues are more indicative of a correct person of interest than eye contact cues, then hand movement cues are weighted more than eye contact cues in the model identifying a person of interest. The model may be based on machine learning methodologies such as neural networks and the like. It will be appreciated that additional features in the forms of cues not listed above may be further incorporated into the model, and the functioning of the model, for example weightings, may be modified through use of a feedback loop, described in greater detail below.

In addition to processing the audio, facial, and gestural cues individually, the OOI identifier 134 may additionally process the cues in combination or bulk (step 212 continued). For example, the OOI identifier 134 may compare audio recorded from audio cues with transcribed audio deduced from lip reading of visual facial cues in order to identify a correct person of interest. In addition, the OOI identifier 134 may further analyse gestures against the analysed audio and facial cues. For example, the OOI identifier 134 may determine whether a gesture such as a hand raise or transition from a sitting to standing position occurred within a threshold window just prior to detecting the audio and visual cues processed to be indicative of speech. In other examples, the OOI identifier 134 may correlate location data of a potential person of interest deduced from audio cues with facial expressions and bodily movement deduced from visual cues of a potential person of interest. Similarly, the OOI identifier 134 may identify an OOI based on locating the faceprint of a person associated with a voiceprint that matches a voice within an audio cue recording. In this case, a match in audio can lead to better identification of a location of the object of interest. The OOI identifier 134 may also match processed video with faceprints to determine an individual's titles or other info to be displayed. The OOI identifier 134 may treat a combination of cues as a single, more heavily weighted cue, which may be a better indicator of the correct object of interest than each cue individually.

The collection of cues by the sensors 112 and sensors 150 may be processed or analysed in the form of a queue or list, for example based on the relative weightings associated with each potential OOI (step 212 continued). The queue may be prioritized based on a value provided by applying the object of interest model(s) 132 to the extracted cues such that more likely OOIs are prioritized within the queue. OOIs may similarly be deprioritized or removed entirely from the queue. For example, if the value associated with a potential OOI drops below a threshold or out of a top percentage of potential OOIs, the potential OOI may be removed from the queue. For example, unlike making eye contact or raising a hand which may increase likelihood of an OOI, lack of eye contact and lowering of a hand may decrease a likelihood of an OOI, and therefore remove the user from the queue. Overall, the output of the OOI identification models 132 may be utilized in maintaining the prioritized queue.

In the example embodiment, the OOI identifier 134 may utilize the processed cues in order to identify a most-likely person of interest of one or more potential people of interest (step 212 continued). In embodiments, this may involve the OOI identifier 134 identifying a potential OOI having a highest number of associated and, in some embodiments, weighted cues. For example, if a potential OOI has a greatest number (combined or individually) of associated audio, facial, and gestural cues, the OOI identifier 134 identifies the potential OOI as the OOI. In other embodiments, each of the cues may be weighted by the OOI models 132 such that cues shown to have a greater association with OOIs are weighted greater than those cues that are not. Such weighting may be accomplished through machine learning techniques such as neural networks. Such techniques may assign weights to the cues or combination of cues as discussed earlier, that are modified and tweaked through use of a feedback loop indicative of whether the correct potential OOI was identified and which cues were most relied upon in the determination, etc. The feedback loop is described in greater detail below.

With reference again to the previously introduced example that included one speaker podium and three video cameras located within an auditorium, the OOI identifier 134 processes the audience member's speech, mouth movements, and standing up to determine that the speech matches up with the mouth movements and standing up. The OOI identifier 134 determines that the audience member is the only object of interest.

The OOI identifier 134 may emphasize and evaluate the OOI for the user (step 214). Having identified a most-likely person/object of interest of the potential people/objects of interest, the OOI identifier 134 emphasizes the identified OOI within the AR device 110. Emphasis techniques may include any method that is noticeable to a user of AR device 110 such as audio or visual effects. Audio effects may be implemented via speakers on the AR device 110 or speakers at a distance from the AR device 110. Audio effects may also be implemented via speakers, earbuds, headphones, etc. that are not physically present in the AR device's 110 direct vicinity. Video effects may be implemented by displaying or projecting images, shapes, colors, or other various effects on or at one or more viewable surfaces. Viewable surfaces may be visible to the user, but also may not be physically present in a vicinity of the AR device 110, for example a speaking podium with an electronic or holographic display. Applied visual emphasis techniques include but are not limited to boxing, highlighting, magnifying, zooming, subtitling, translating, coloring, enhancing, amplifying, and transcribing. Applied audio emphasis includes amplification, enhancement, transcribing, and translation, or audio replay to associated audio devices such as speakers, earbuds, headphones, etc.

The OOI identifier 134 may evaluate whether the correct person/object of interest was emphasized (step 214 continued). The OOI identifier 134 may evaluate whether a correct person/object of interest was emphasized as part of a feedback loop providing the capability to modify and tweak the OOI models 132 that the OOI identifier 134 utilizes in identifying a person of interest. In embodiments, the feedback loop may simply provide a means for a user to indicate whether a correct person of interest was selected. For example, the OOI identifier 134 may prompt a user to select an option indicative of whether the correct OOI was identified. The option may comprise a toggle switch, button, slider, etc. that may be selected by the user manually by hand using a button/touchscreen/etc., by voice, by eye movement, and the like. In some embodiments, the OOI identifier 134 may emphasize multiple OOIs, for example based on priority, and prompt the user to select which OOIs should be prioritized. This may be done by the OOI identifier 134 displaying number or letter values adjacent each emphasized object of interest and awaiting the user's input. The OOI identifier 134 may remind the user of an object of interest that has not been addressed after a set absolute or relative threshold. The OOI identifier 134 may then remove the object of interest and may later adjust the OOI models 132 accordingly. If an incorrect object of interest was emphasized, the OOI identifier 134 may deemphasize the incorrect object of interest and update the emphasis based on the aforementioned priority queue.

In other embodiments, the OOI identifier 134 may implement various analyses to determine whether a correct person/object of interest was emphasized (step 214 continued). For example, the OOI identifier 134 may determine whether the emphasized object of interest has engaged in conversation with a user of the AR device 110. This determination may be made based on the aforementioned cues, such as eye contact and mouth movement visual cues in combination with matching audio. In some embodiments, the user's failure to select an object of interest over a period of time may indicate to the OOI identifier 134 that the object of interest should not have been identified as a potential object of interest. At this point, the OOI identifier 134 may reassess the current cues individually and in combination and, having identified a most likely person or object of interest, the OOI identifier 134 may be configured to pay more attention to the emphasized person/object of interest and be capable of providing a more in-depth analyses with a higher accuracy level. In other embodiments, alternative feedback loops may be incorporated in order to not only identify a correct person or object of interest, but also improve an accuracy of the model.

In some embodiments, the OOI identifier may focus specifically on one or more audio or visual cues to indicate the beginning and end of emphasis of a particular OOI (step 214 continued). For example, the OOI identifier may rely on an audience members' hand being raised to signal the start of emphasis and may rely on the audience members' hand being lowered to signal the end of emphasis. In yet other embodiments, the OOI identifier 134 may emphasize an object for a set duration based on the user's preferences as mentioned above. For example, the user may desire each object to be emphasized for exactly three seconds. The OOI identifier 134 may cease to emphasize an object of interest when it believes there are no longer any objects of interest. The OOI identifier 134 may continue collecting cues until the session is completed or the user ends the program. If an incorrect object of interest was emphasized, the OOI identifier 134 may deemphasize the incorrect object of interest and find any correct objects of interest by processing cues and applying the OOI models 132 again.

With reference again to the previously introduced example that included one speaker podium and three video cameras located within an auditorium, the OOI identifier 134 emphasizes the speaking audience member as the OOI. According to the user's predetermined user settings and preferences as discussed above, it displays a red circle with diameter of one inch and thickness of five millimeters on the user's viewing apparatus at the location of the individual at the front right of the auditorium who is standing up and speaking. Additionally, the AR device 110 amplifies the audience member's speech according to the user's predetermined user settings and preferences to sixty decibels such that the user and other audience members in the auditorium are capable of hearing clearly. The OOI identifier 134 evaluates the OOI and confirms that the audience member at the front right of the auditorium who is standing up and speaking is the correct OOI.

The OOI identifier 134 may adjust the models (step 216). In the example embodiment, the OOI identifier 134 may adjust the OOI models 132 based on the determination above, regarding whether a correct person or object of interest was identified and emphasized. For example, the OOI identifier 134 may increase a weight of a cue that was heavily relied on in determining that a correct person or object of interest was emphasized. Alternatively, the OOI identifier 134 may decrease the weight of a cue that was relied on in an incorrect identification of a person or object of interest. Such adjustments may be performed every time a person or object of interest is identified.

With reference again to the previously introduced example that included one speaker podium and three video cameras located within an auditorium, the OOI identifier adjusts the OOI models 132 to increase the weight of detected speech.

Figure 3:
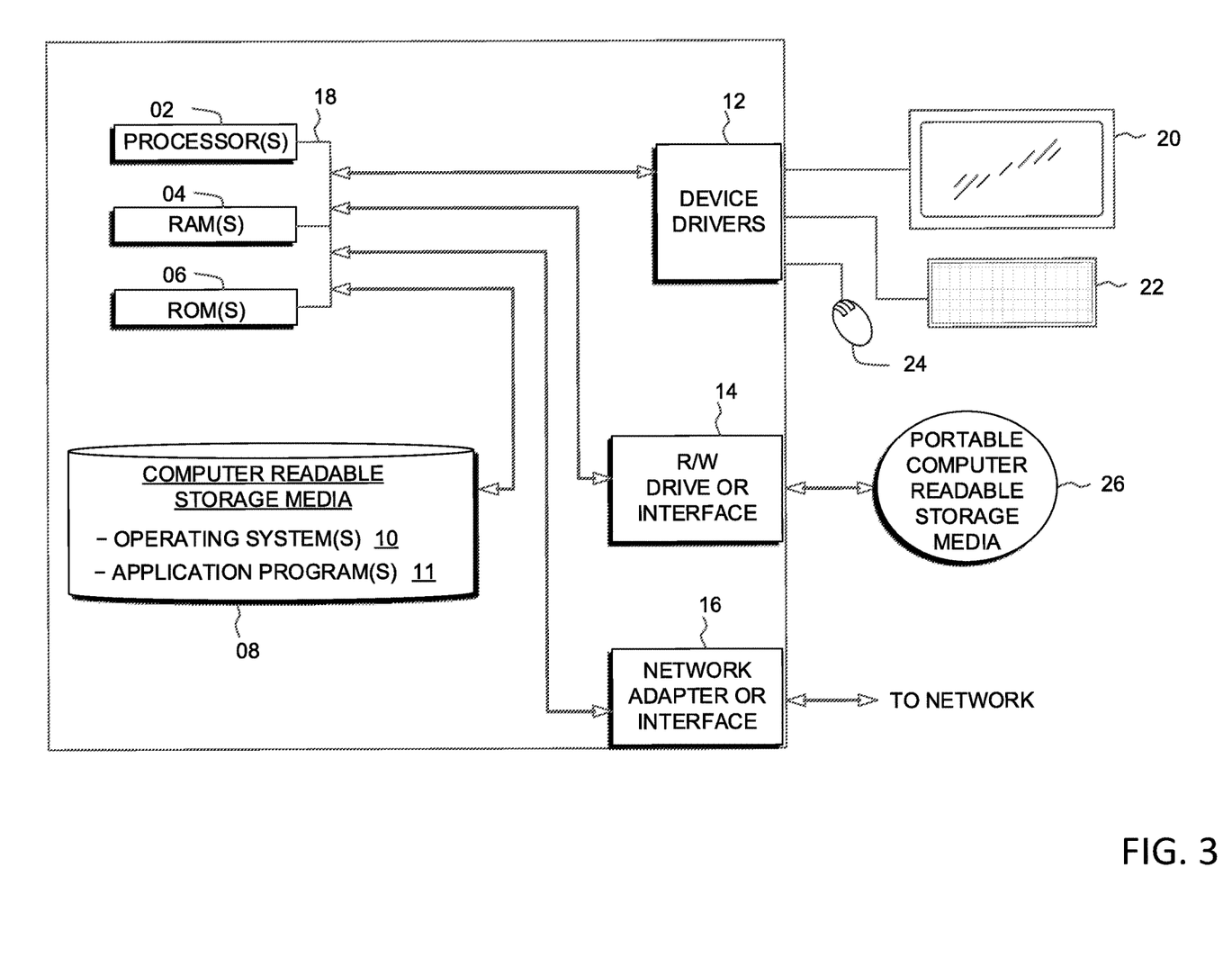
FIG. 3 depicts an exemplary block diagram depicting the hardware components of the OOI identification system of FIG. 1, in accordance with the exemplary embodiments.

FIG. 3 depicts a block diagram of devices within the OOI identifying system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
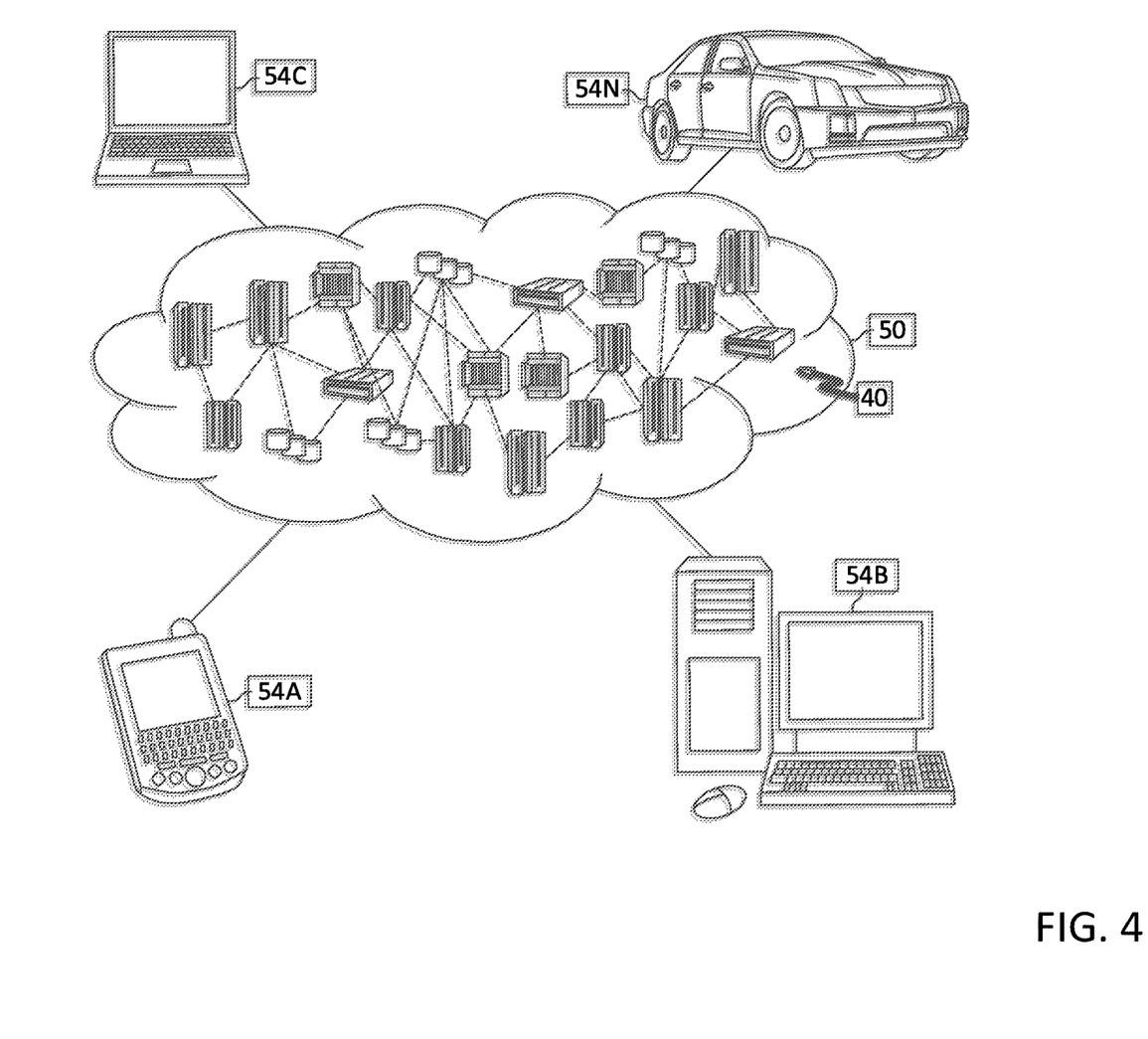
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
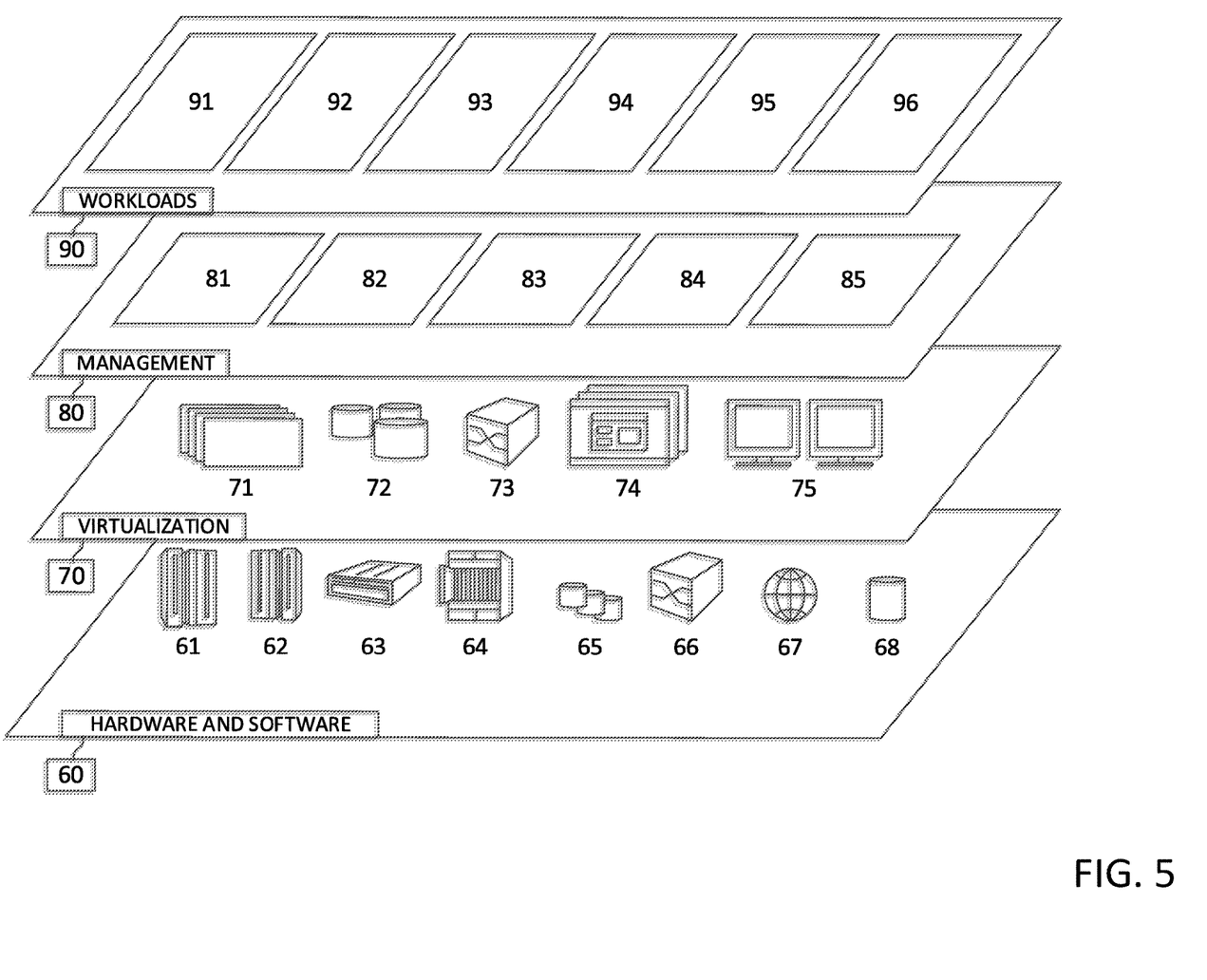
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object of interest identification 96. Object of interest identification 96 may identify objects of interest in an environment and emphasize the objects of interest within augmented reality.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying and emphasizing two or more speaking persons of interest, the method comprising:

detecting one or more cues selected from a group comprising one or more audio cues and one or more visual cues of the two or more speaking persons of interest;

identifying the two or more speaking persons of interest out of a crowd of three or more people based on the detected one or more cues and a model; and emphasizing the two or more speaking persons of interest using an augmented reality device based on a priority, wherein one of the two or more speaking persons of interest is emphasized greater than the one or more other speaking persons of interest.

2. The method of claim 1, wherein the model correlates the one or more cues with two or more most probable speaking persons of interest.

3. The method of claim 1, further comprising:

receiving feedback indicative of whether a correct two or more speaking persons of interest were emphasized; and adjusting the model based on the received feedback.

4. The method of claim 1, wherein emphasizing the two or more objects of interest within an augmented reality is selected from a group consisting of boxing, highlighting, magnifying, zooming, subtitling, translating, coloring, enhancing, amplifying, and transcribing.

5. The method of claim 1, wherein the audio cues include audio selected from a group consisting of speech and noises.

6. The method of claim 1, wherein the visual cues include one or more facial cues selected from the group consisting of movement of a mouth, a nose, eyes, ears, cheeks, and a forehead.

7. The method of claim 1, wherein the visual cues include one or more gestural cues selected from the group consisting of standing, sitting, lying prone, lying supine, transitioning from one position to another, moving a hand, moving a leg, moving a neck, and turning a head.

8. A computer program product for identifying and emphasizing two or more speaking persons of interest, the computer program product comprising:
- one or more non-transitory computer-readable storage media and program instructions stored on the one or more non-transitory computer-readable storage media capable of performing a method, the method comprising:
- detecting one or more cues selected from a group comprising one or more audio cues and one or more visual cues of the two or more speaking persons of interest;
- identifying the two or more speaking persons of interest out of a crowd of three or more people based on the detected one or more cues and a model; and
- emphasizing the two or more speaking persons of interest using an augmented reality device based on a priority, wherein one of the two or more speaking persons of interest is emphasized greater than the one or more other speaking persons of interest.

9. The computer program product of claim 8, wherein the model correlates the one or more cues with two or more most probable speaking persons of interest.

10. The computer program product of claim 8, further comprising:
- receiving feedback indicative of whether a correct two or more speaking persons of interest were emphasized; and
- adjusting the model based on the received feedback.

11. The computer program product of claim 8, wherein emphasizing the two or more objects of interest within an augmented reality is selected from a group consisting of boxing, highlighting, magnifying, zooming, subtitling, translating, coloring, enhancing, amplifying, and transcribing.

12. The computer program product of claim 8, wherein the audio cues include audio selected from a group consisting of speech and noises.

13. The computer program product of claim 8, wherein the visual cues include one or more facial cues selected from the group consisting of movement of a mouth, a nose, eyes, ears, cheeks, and a forehead.

14. The computer program product of claim 8, wherein the visual cues include one or more gestural cues selected from the group consisting of standing, sitting, lying prone, lying supine, transitioning from one position to another, moving a hand, moving a leg, moving a neck, and turning a head.

15. A computer system for identifying and emphasizing two or more speaking persons of interest, the computer system comprising:
- one or more computer processors, one or more computer-readable storage media, and program instructions stored on the one or more of the computer-readable storage media for execution by at least one of the one or more processors capable of performing a method, the method comprising:
- detecting one or more cues selected from a group comprising one or more audio cues and one or more visual cues of the two or more speaking persons of interest;
- identifying the two or more speaking persons of interest out of a crowd of three or more people based on the detected one or more cues and a model; and
- emphasizing the two or more speaking persons of interest using an augmented reality device based on a priority, wherein one of the two or more speaking persons of interest is emphasized greater than the one or more other speaking persons of interest.

16. The computer system of claim 15, wherein the model correlates the one or more cues with two or more most probable speaking persons of interest.

17. The computer system of claim 15, further comprising:
- receiving feedback indicative of whether a correct two or more speaking persons of interest were emphasized; and
- adjusting the model based on the received feedback.

18. The computer system of claim 15, wherein emphasizing the two or more objects of interest within an augmented reality is selected from a group consisting of boxing, highlighting, magnifying, zooming, subtitling, translating, coloring, enhancing, amplifying, and transcribing.

19. The computer system of claim 15, wherein the audio cues include audio selected from a group consisting of speech and noises.

20. The computer system of claim 15, wherein the visual cues include one or more facial or gestural cues selected from the group consisting of movement of a mouth, movement of a nose, movement of eyes, movement of ears, movement of cheeks, movement of a forehead, standing, sitting, lying prone, lying supine, transitioning from one position to another, moving a hand, moving a leg, moving a neck, and turning a head.

* * * * *